Feb. 20, 1940.  W. J. ROGERS  2,191,205
INDICATOR SWITCH
Filed Nov. 20, 1937  2 Sheets-Sheet 1

INVENTOR
William John Rogers

Feb. 20, 1940.  W. J. ROGERS  2,191,205
INDICATOR SWITCH
Filed Nov. 20, 1937  2 Sheets-Sheet 2
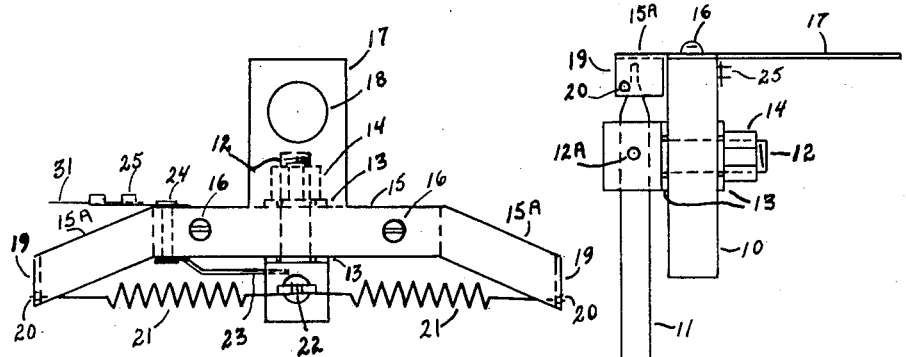
FIG 5
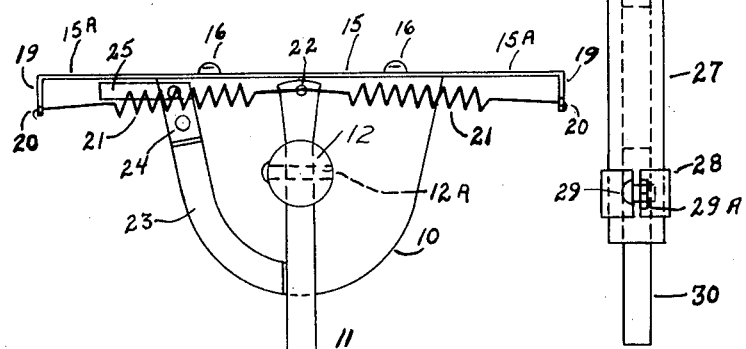
FIG 6
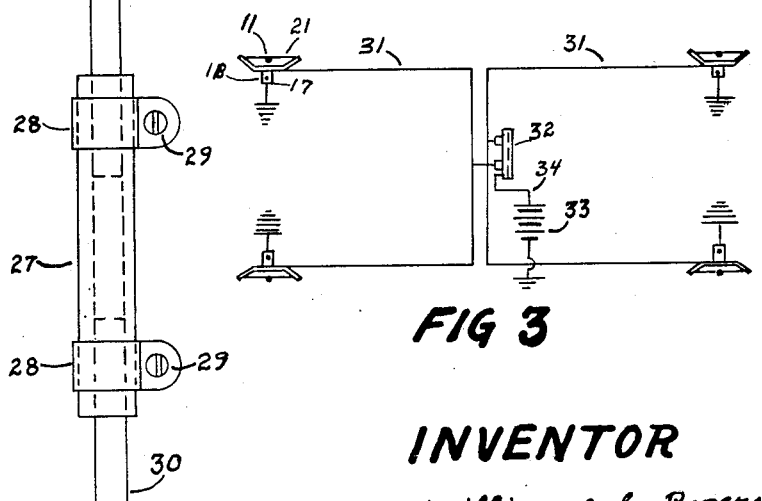
FIG 3
FIG 4
INVENTOR
William John Rogers Patented Feb. 20, 1940

2,191,205

UNITED STATES PATENT OFFICE 2,191,205

INDICATOR SWITCH

William John Rogers, Napa, Calif.

Application November 20, 1937, Serial No. 175,692

1 Claim. (Cl. 200—58)

This invention relates to a device for indicating loss of air in a pneumatic tire, and more particularly to a device of this character for indicating loss of air in such tire while mounted on an automobile or on an automobile trailer and while the vehicle is in motion.

Applicant is aware that it is old in the art to provide devices having this as their object, but so far as he is aware, no simple, efficient, durable, inexpensive and easily installed device of this nature has been produced.

An object of the present invention is to provide a device of this character which is simple in construction.

Another object is to provide a device of this character which is reliable in operation.

A further object is to provide a device of this character which is of long life.

A still further object is to provide a device of this character which is inexpensive to manufacture.

A still further object is to provide a device of this character which is easily installed on any automobile or trailer without changing the construction of the chassis.

A still further object is to provide a device of this character which indicates the loss of a predetermined amount of air.

Other objects will be apparent from the following description and from the accompanying drawings, forming a part of this disclosure, and in which:

Fig. 3 is a diagrammatic view of the electric circuits.

Fig. 4 is a front view.

Fig. 5 is a plan view.

Fig. 6 is a side view.

Like numerals of reference designate corresponding parts throughout the several views.

Figure 2:
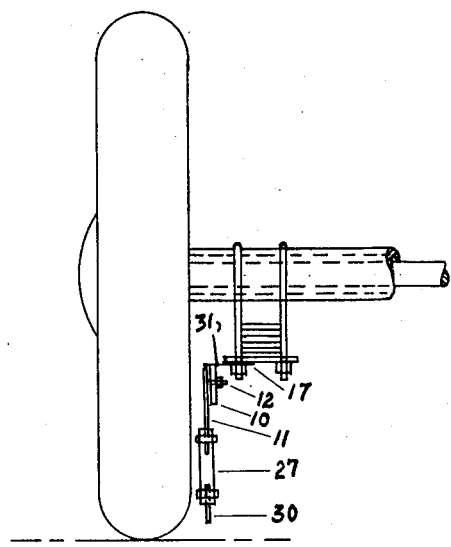
Fig. 2 is a rear fragmentary view of the same, viewed from the rear of the wheel.

Referring to the drawings in detail, the numeral 10 designates the main body member of my invention, formed, in the illustration shown, into a substantially semi-circular shape, and being provided at its top portion with a supporting bracket 15 and with a swing arm 11 pivotally secured to the body member by a bolt 12 provided with washers 13 and a threaded lock nut 14, said swing arm 11 is secured to pivot bolt 12 by means of rivet 12a.

The supporting bracket 15 provided with a centrally disposed depressed portion 15a, for spring support convenience, and at each end with a downwardly extending ear 19 is secured to the body member by screws 16.

Extending inwardly from the lower end of ears 19, each of which is provided with a hole 20 are coil springs 21 secured therein and having their other ends engaged by the top end of swing arm 11 which is provided with the hole 22 in its upper portion; this upper portion is preferably flattened, as more particularly shown in Fig. 6, in order to better accommodate the ends of springs 21. Swing arm 11 is further preferably provided with an off-center extension to which the springs are secured. This swing arm is analogous to a single throw switch on an electric circuit.

Extending rearwardly from the supporting bracket 15 is a lug 17 provided with a hole 18. It should be noted that members 15, 15a, 17 and 19 are preferably constructed of one piece. Secured to the front side of main body member 10 by rivet 24 is an electrical contact finger 23, and secured by the other end of the rivet and on the rear side of the said main body member is a ground wire terminal 25 provided with prongs 26 to which is secured a lead wire 31.

It should be noted that members 11, 23, 24 and 25 are constructed of non-corrosive electrically conductive material; that main body member 10 is constructed preferably of insulating material, since it acts as an open switch panel in the ground circuit; and that ground wire terminal 25 is secured to insulated main body member 10 to form an open ground circuit which can be closed only by means of swing arm 11.

Removably secured to the lower end of swing arm 11 by means of clamp 28 is a hollow resilient member 27, such as a heavy walled rubber hose, and removably secured to the lower end of member 27 is a roadway surface contact member 30 held in position by clamp 28 provided with screws 29 and screw nuts 29a. Member 30 is sufficiently short in length that a free space is left in member 27, thus permitting adjustment vertically of member 30. This feature is important, as will hereinafter appear, as it contributes added utility to my invention.

The wire lead 31, as more particularly shown in Fig. 3, extends from terminal prongs 26 to the incandescent lamp case 32 which is provided with an incandescent light bulb. I prefer to mount four light bulbs in one case, one bulb for each of the four lead-in ground wires, as will hereinafter appear. The lamp case 32 is secured in any convenient manner to any part of the automobile which is visible to the driver, and preferably to the instrument board. 33 is the regular storage battery carried by the automobile. It is provided with positive wire 34 which leads to lamp case 32.

It should be noted that the coil springs 21 serve as a balancer means for maintaining the swing arm 11 in a substantially vertical position when the roadway contacting member 30 is free of the road surface, which position holds the swing arm in a neutral or disengaged manner with reference to the electrical contact finger 23. It should also be noted that the springs 21 serve also as a resilient augmenting means to the resilient member 27 toward road surface irregularities and obstructions which may be encountered by road surface contact member 30 during its period of travel in actual contact with the roadway. It has been found by applicant, in the actual use of his invention, that effective shock absorbing qualities are thus provided which contribute to the long life and to the effective co-operation of members of the combination.

Figure 1:
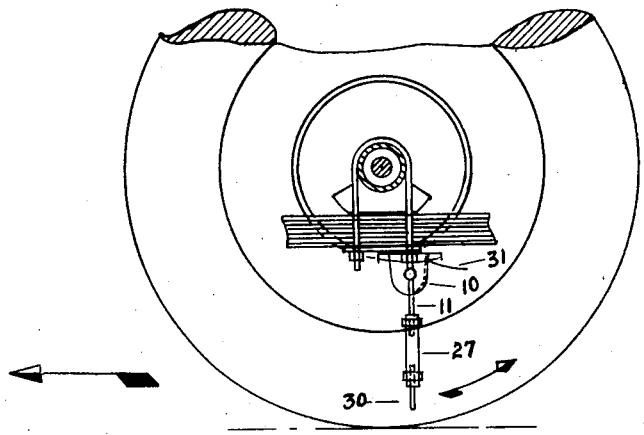
Fig. 1 is a side fragmentary view of my invention in position, viewed from the spring side of an automobile wheel.

Lug 17 of the supporting bracket is secured to the spring shackle bolt of the automobile as shown in Figs. 1 and 2 through lug hole 18, but may be suitably secured instead, to the axle or the axle housing, at any selective point by any convenient and suitable means. Lug 17 and members 15, 15a, 19, 20, 21 and 22 complete the ground circuit to swing arm 11, thus closing the circuit when said swing arm contacts member 23.

Roadway surface contact member 30 has a wear resistant hardened roadway contact point, and is adjusted to any selective height by means of clamps 28. Such selective height above the roadway surface will permit allowable tire deflation to take place without the end of member 30 touching the roadway, but will not permit unallowable tire deflation (with reference to loss of air in the tire), to take place without member 30 contacting the roadway. Thus it will be seen that when the tire has lost that part of its air which may be said to correspond to the height at which the roadway contact member 30 was set, and the surface of the partially deflated tire thus caused to run in substantially the same plane as that in which the lower end of roadway surface contact member 30 is held, said end of member 30 will have been lowered and thus caused to contact the roadway.

The operation of my invention is as follows:

When a normally inflated and operating tire, on an automobile or automobile house trailer in motion begins to lose air, the roadway contact member 30 becomes lowered as set forth above. The less number of pounds pressure of air below the pressure desired, which the tire is normally operating on, the nearer to the road surface the end of member 30 travels. It is obvious, therefore, that loss of air of differing amounts, may be indicated by my invention, depending upon the position above the roadway the contact member 30 is adjusted to. If, now, such loss of air occurs, member 30 will be caused to contact the road surface and to travel along thereover, as will be readily understood by reference to Fig. 1. Member 30 is thus caused to actuate swing arm 11, through resilient member 27; and the swing arm, which normally stands in a substantially vertical position and disengaged from electrical contact finger 23, is thus caused to move in the general direction of member 23 and caused to be pulled by member 30 into contact with finger 23. This operation closes the ground circuit and causes the bulb in the lamp case to light and thus to signal to the driver such loss of air in the tire. The extent to which the tire has become deflated at this time, or is becoming deflated, as indicated, is dependent upon the initial adjustment of road surface contact member 30, as hereinbefore pointed out. It will thus be seen that predetermined amounts of air loss may be indicated, including: (a) that which is a safe amount to lose under the particular driving conditions being encountered; (b) that which is a dangerous amount with reference to tire cutting; (c) that which is a dangerous amount with reference to driving.

It will be understood that four units are preferably employed, one for each wheel, although each unit is independent in action of the other three units; and that the wiring is strung in any suitable and convenient manner from the terminal prongs to the lamp case.

This disclosure is descriptive only, and not limitative, and minor modifications may be made without departing from the scope of the invention as revealed and claimed.

It is seen from the foregoing that a device for indicating loss of air in a pneumatic tire while mounted on a vehicle and while the vehicle is in motion, has been revealed which is simple in construction, reliable in operation, of long life, inexpensive to manufacture, easily installed for use and which indicates the loss of a predetermined amount of air.

The various members of my invention may be of any suitable and selective size, shape or form, and they may be constructed of any suitable and selective material, so long as the various members of the combination co-act and co-operate to perform the functions and produce the results contemplated, without departing from the spirit of the invention.

I claim:

A device of the class described including, in combination, a bracket adapted to be mounted to the spring shackle of a vehicle, a substantially semi-circular flattened body member depending downwardly from said bracket, a pivotally mounted arm upon said body member, a flattened electrical contact mounted upon said bracket and extending parallel with and against the face of said body member and adapted to be engaged by said arm when the arm is caused to move about its pivot, said bracket being provided with a downwardly extending lug at each of its ends, a coil spring extending from each of said lugs inwardly and engaging the top portion of said pivotally mounted arm and adapted to maintain said arm in its normal disengaged position with reference to said electrical contact and to permit said arm to be caused to move about its pivot to contact said electrical contact member, a vertically adjustable, resilient member removably secured to the lower end of said arm, and a vertically adjustable removably secured member extending from said resilient member and adapted to contact the road and thus to cause the pivotally mounted arm to move about its pivot and engage said electrical contact.

WILLIAM JOHN ROGERS.